United States Patent
Nakazawa

Patent Number: 5,974,246
Date of Patent: Oct. 26, 1999

[54] METHOD OF DETERMINING OPTIMUM PRODUCT DESIGN PARAMETERS AND SYSTEM THEREFOR

[76] Inventor: Hiromu Nakazawa, 1-50-7, Matsugaoka, Tokorozawa-shi Saitama-ken, Japan, 359

[21] Appl. No.: 08/927,491

[22] Filed: Sep. 11, 1997

[30] Foreign Application Priority Data

Apr. 28, 1997 [JP] Japan ..................................... 9-111253

[51] Int. Cl.$^6$ .................................................. G05B 17/00
[52] U.S. Cl. ................................ 395/500.23; 364/468.01
[58] Field of Search ............................................ 364/512

[56] References Cited

PUBLICATIONS

Nakazawa, "Process Planning Method by Information Concept," Journal of Japan Society of Precision Engineering, pp. 91–96 (translated abstract), 1983.
Nakazawa, "Information Integration Method," International Symposium on Design and Synthesis, pp. 171–176, Jul. 1984.
Nakazawa, "Process Planning Based on Information Concept," Robotics and Computer Integrated Manufacturing, pp. 115–123, 1984.
"Principles of Design", Nam P. Suh, ISBN 0-19-504345-6, 1990.
Bisgaard, "Designing Experiments for Tolerancing Assembled Products," CQPI Report No. 99, University of Wisconsin, 1993.
Ramberg et al, "Designing Simulation Experiments: Taguchi Methods and Response Surface Metamodels" Proceedings of the 1991 Winter Simulation Conference, 1991.
"Axiomatic Design and Manufacturing Systems Design," http://www-ieem. ust.hk/97 homepage/dfaculty/ajay/courses/ieem513/AxiomDes.htm.
Nakazawa et al, "Decision System of Optimum Grinding Conditions Based Information Integration Method," Journal of the Japan Society for Precision Engineering,; Paper No. 57, May 1991.

*Primary Examiner*—Kevin J. Teska
*Assistant Examiner*—Samuel Broda
*Attorney, Agent, or Firm*—Pennie & Edmonds LLP

[57] ABSTRACT

Several levels of a plurality (n) of design parameters of a product are inputted to means for designing trial products to output a trial product list based on a given orthogonal table (step 201). The products designed by the trial product designing are evaluated for a plurality (m) of evaluation items to afford evaluation data (step 203). A system range for each level is obtained from the evaluation data for the design parameter (step 204). The deducing means calculates an amount of information for each level from the system range and a design range for each level and adds the amounts of information for all of the evaluation items to find a total amount of information for each level (step 206). A characteristic curve for the design parameter is depicted based on the total amounts of information and a value of design parameter giving a minimum total amount of information is determined and employed as an optimum value of the design parameter (step 208). Optimum values of the other design parameters are similarly determined to afford optimum values for all of the design parameters (n). According to the method and system of the present invention, it is possible to efficiently an extremely easily determine optimum values of design parameters in a short period of time.

8 Claims, 5 Drawing Sheets

METHOD OF DETERMINING OPTIMUM PRODUCT DESIGN PARAMETERS AND SYSTEM THEREFOR

BACKGROUND OF THE INVENTION

1. Field of the Invention

The present invention relates to a method for determining optimum values of design parameters, which makes it possible to determine optimum values of design parameters extremely easily and efficiently in a short time in product and system development.

2. Related Art

In product and system development in various industrial fields, a very important aspect of the development process is how to determine various kinds of design parameters such as materials, various dimensions including length, width, height, depth, thickness, diameter and pitch of products and components and parts constituting the products, and the relationships between components thereof including location, angle, distance and operation conditions. Therefore, a vast number of experiments are required to determine their optimum values, particularly, in a product required to meet several performance items, while it is also difficult to efficiently determine optimum values of a plurality of parameters even from the results of such experiments. Therefore, such determination must often rely on the experience and intuition of highly skilled persons.

On the other hand, methods have been suggested for obtaining optimum values by making a mathematical model containing given design parameters and required performance items (i.e., multivariate analysis). Practically, however, it is almost impossible to prepare such a mathematical model during development of products. In particular, when there are several required performance items and they should be determined systematically, preparation of such mathematical model itself requires a great number of experiments and, even if such a mathematical model can be prepared, it cannot always function well because of other factors including, for example, how relative importance is given to each required performance item, tradeoff among a plurality of the required performance items and the like.

A method utilizing the Taguchi method, which is used in the field of quality engineering, has also been known. However, this method can be used for only cases involving a single required performance item. Therefore, development of products by this method takes a lot of time and the result sometimes contradicts other items.

Therefore, an object of the present invention is to provide a method and system which make it possible to efficiently determine optimum values of design parameters using data from a small number of experiments. Another object of the present invention is to provide a method and system for easily determining the optimum values, which does not require experience of skilled artisans or the construction of a mathematical model for every design parameter.

SUMMARY OF THE INVENTION

To achieve the above objects, the present inventor invented a method which makes it possible to extremely easily determine optimum values of design parameters (Nakazawa Method). This method utilizes an orthogonal table, which is generally used for design of experiments, for product development and the concept of a modified Information Integration Method as a method to evaluation analysis. In this method, products having values of design parameters listed in an orthogonal table of design of experiments (trial products) are evaluated for their performance (required evaluation items) by experiments or simulation, amounts of information are calculated for each trial product by processing the evaluation results obtained as the results of the experiments and simulation and optimum values of the design parameters are determined based on the amounts of information.

That is, the present invention provides a method for determining optimum values of design parameters, wherein the optimum values of design parameters are obtained by evaluating products produced with a plurality (n) of design parameters (P1, P2 ... Pn) for a plurality (m) of evaluation items (D1, D2 ... Dm). The method of the present invention is characterized in that 1) a plurality of trial products, each having a different combination of one level for each design parameter among several levels, are evaluated for a plurality (m) of the evaluation items to afford evaluation values; 2) for one design parameter (P1), a system range for each level is obtained from evaluation values of one evaluation item (D1) for each level and an amount of information (I1) is obtained for each level from the system range and a design range for the evaluation item; 3) amounts of information (I2 to Im) for each level of the one design parameter (P1) are similarly obtained for the other evaluation items (D2, D3 ... Dm) and the amounts of information (I1 to Im) for the evaluations items (D1 to Dm) are added to obtain a total amount of information (I=ΣIk where k is 1 to m) for each level; 4) a characteristic curve of the total amount of information for the one design parameter (P1) is depicted from the total amounts of information obtained for the levels and a value of the design parameter giving the smallest total amount of information is considered as an optimum value of the design parameter (P1); and 5) the steps of 2) to 4) are performed for the other design parameters (P2, P3 ... Pn).

The system range of each level (Rs) means the range of values which an evaluation item can take with that level and can be obtained from an average of evaluation values of one evaluation item with the level ($d_{ave}$) and standard deviation ($\sigma$) in accordance with the equation of Rs=$d_{ave}$±a $\sigma$ where a is a constant of 1.0 or The amount of information I is an index for indicating information, energy and matter necessary for transferring the system from the system range to the design range. The smaller of the value of the amount of information, the more suitable the system is for the design range. The amount of information I can be obtained in accordance with the equation I=ln(Rs/Rc), where Rs represents the system range and Rc represents an overlapping range of the system range and the design range Rd (common range).

When the method for determining optimum values of design parameters of the present invention, which utilizes the amount of information as an index, is applied to designing a product having a plurality of design parameters, optimum values of the design parameters can be efficiently determined while considering all of the required performance items by evaluating only products having one of 2 or 3 levels of each design parameter (about 9 to 27 products in total) for a plurality of the evaluation items. Therefore, the method enables marked reduction of the development period and makes it predictable.

As one embodiment of the method of the present invention, there is provided a computerized method for determining optimum values of design parameters comprising the steps of 1) inputting evaluation values obtained by evaluating a plurality of trial products each having a combination of one of several levels given for each of a plurality (n) of design parameters (P1, P2 ... Pn) regarding a plurality (m) of evaluation items (D1, D2 ... Dm); 2) for one design parameter (P1), obtaining a system range (Rs) for each level from an average of evaluation values of one evaluation item (D1) for each level ($D_{dave}$) and a standard deviation ($\sigma$) in accordance with the equation of Rs=$d_{ave}$±a $\sigma$, where a is a positive constant of 1.0 or more 3) obtaining an amount of information (I1) for each level from the system range (Rs) and a predetermined design range (Rd) in accordance with the equation of I1=ln(Rs/Rc) where Rs represents the system range and Rc represents an overlapping range of the system range (Rs) and the design range (Rd) (Rc=Rs∩Rd); 4) similarly obtaining amounts of information (I2) to (Im) for each level of the design parameter (P1) for the other evaluation items (D2, D3 ... Dm); 5) adding the amounts of information (I1 to Im) of the evaluation items (D1 to Dm) to afford a total amount of information (I=ΣIk where k is 1 to m) for each level; 6) depicting a characteristic curve of the total amount of information for the design parameter (P1); 7) determining a value of the design parameter giving the smallest total amount of information as an optimum value of the design parameter (P1) based on the characteristic curve; and 8) performing the steps 2) to 7) regarding each of the other design parameters (P2, P3 ... Pn) to afford optimum values for all of the design parameters.

The present invention further provides a system for determining optimum values of design parameters of products, which comprises means for designing trial products which is inputted with several levels of a plurality (n) of design parameters of a product and outputs a trial product design based on a prescribed orthogonal table; means for depicting characteristic curves which is inputted with evaluation values (evaluation data) obtained by evaluation of a plurality of trial products designed by the means for designing trial products for a plurality (m) of evaluation items and depicting characteristic curves of the evaluation data for the values of design parameters; and means for deducing optimum values of the design parameters which outputs the optimum values from the characteristic curves depicted by the means for depicting characteristic curves and inputted design ranges. The deducing means finds the optimum values of the design parameters according to the method for determining optimum values of design parameters mentioned above.

BRIEF DESCRIPTION OF THE DRAWINGS

FIG. 5 represents graphs for explaining the significance of the amount of information and the calculation method therefor. FIG. 5($a$) represents the actual relationship between a system range and a design range. FIG. 5($b$) represents a simplified model of the system range and the design range for the calculation of the amount of information.

DETAILED DESCRIPTION OF THE INVENTION

Figure 1:
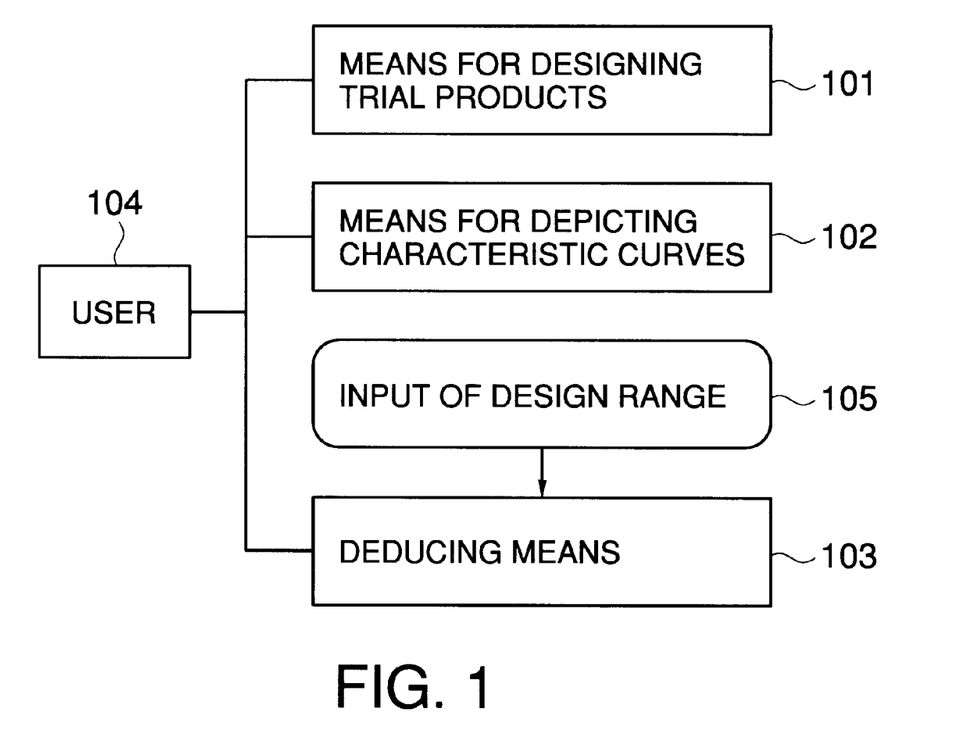
FIG. 1 is an overall block diagram indicating a system for realizing the method for determining optimum values of design parameters according to the present invention.
Figure 2:
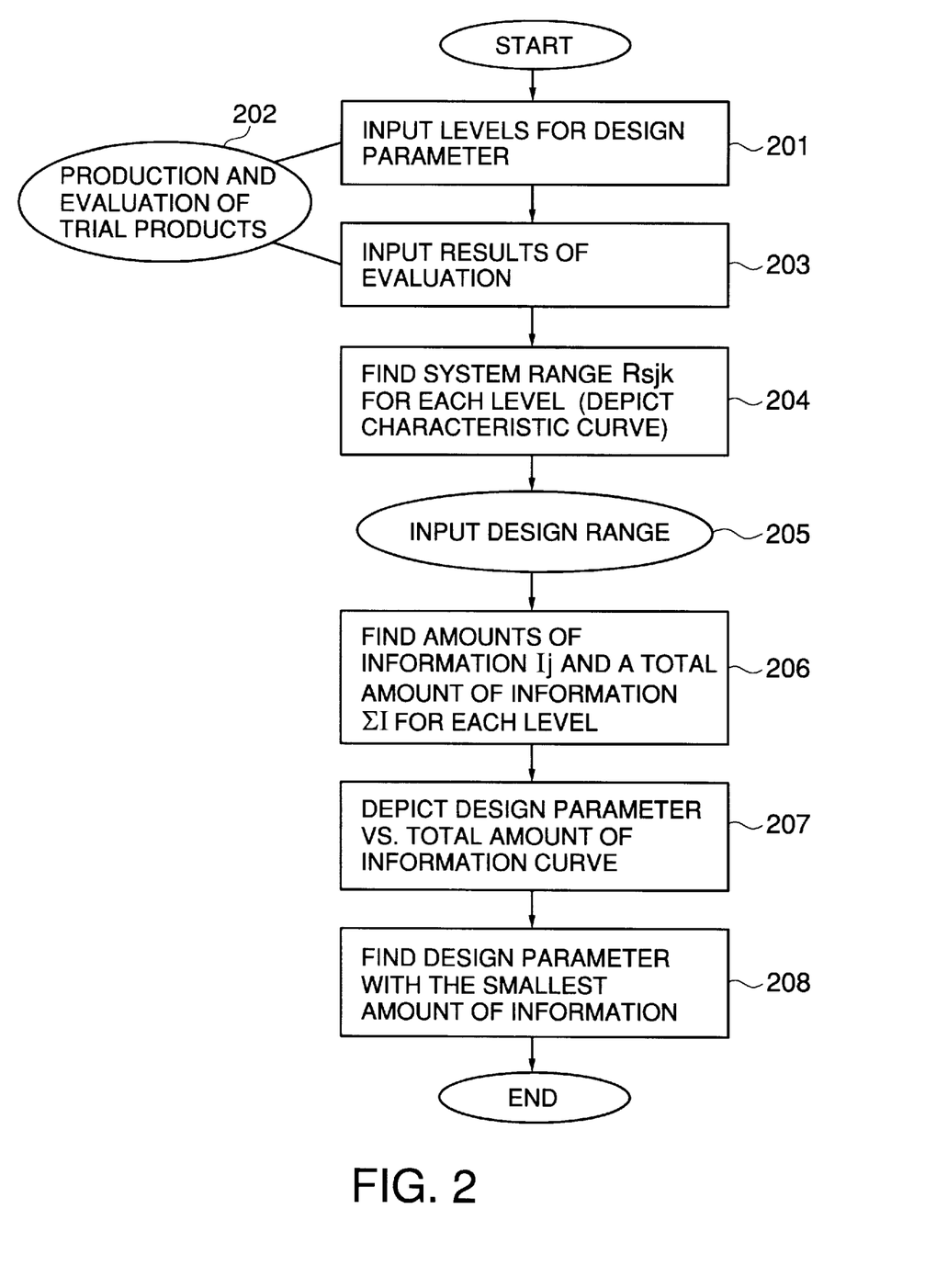
FIG. 2 is a flow chart representing an example of the method for determining optimum values of design parameters according to the present invention.

The method and system for determining optimum values of design parameters of the present invention will be specifically explained hereinafter with reference to the appended drawings. FIG. 1 is a block diagram of a system for performing the method for determining optimum values of design parameters according to the present invention. FIG. 2 is a flow chart of the method for determining that optimum values of design parameters according to the present invention.

The system shown in FIG. 1 essentially consists of means for designing trial products 101, means for depicting characteristic curves 102 and means for deducing optimum values of design parameters 103, all of which execute necessary processing steps according to a computer program designed in an arbitrary language and can be contained in a single computer as an integrated system. Therefore, the system for determining optimum values of design parameters according to the present invention shown in FIG. 1 should further comprises means such as a keyboard or mouse for enabling a user to input necessary information to the means for designing trial products 101, the means for depicting characteristic curves 102 and the deducing means 103, and a display for displaying GUI and the results of calculation and processing in the means, though they are not shown.

When specific values of design parameters (levels) intended to be used for product design are inputted to the means for designing trial product 101, it outputs a list of trial products to be produced based on a prescribed orthogonal table. A user 104 can manufacture or simulate the products mentioned on the list and evaluate them for given evaluation items. When the evaluation results for the trial products are inputted into the means for depicting characteristic curves 102, it forms and depicts a characteristic curve of the design parameter for each of the evaluation items. The resulting curves constitute a database of the system. When a range of design parameter required for each evaluation item (design range) 105 is inputted into the deducing means 103, an optimum value is deduced for each design parameter and outputted.

The operation of the system will be explained with reference to the flow chart of FIG. 2.

First, as a premise for performing the method for determining optimum values of design parameters of the present invention, required performance items of a product, i.e., evaluation items (D1 to Dm) are decided (step 201). Though the number of the evaluation items (m) is not limited, for simplicity it is assumed here that evaluation is performed for four evaluation items (D1, D2, D3 and D4). Then, ranges required for the evaluation items (design range Rd) are determined. The design ranges are used for obtaining optimum values in the deducing means 103. The span of the design range may be varied depending on the importance of the evaluation item and, for a more important item, a narrower range is determined. In the method for determining optimum values of design parameters of the present invention, as also described hereinafter, this makes it possible to automatically and efficiently give relative importance to each evaluation item without additional weighting of the items.

The design parameters necessary for the product design should be decided by the user 104. The number of the design parameters (n) determines the orthogonal table (orthogonal array) to be used. As the orthogonal table, one utilized in design of experiments can be used, and it contains an array of combinations of 2 to 3 levels for each of a plurality of design parameters so that each level of design parameters should be equally contained in the combinations with a minimum trial number. Fisher's L9, L18, L27 orthogonal tables and the like may be used.

TABLE 1

| | $L_9 (3^4)$ | | | |
|---|---|---|---|---|
| Trial | Design parameter | | | |
| product No. | P1 | P2 | P3 | P4 |
| 1 | 1 | 1 | 1 | 1 |
| 2 | 1 | 2 | 2 | 2 |
| 3 | 1 | 3 | 3 | 3 |
| 4 | 2 | 1 | 2 | 3 |
| 5 | 2 | 2 | 3 | 1 |
| 6 | 2 | 3 | 1 | 2 |
| 7 | 3 | 1 | 3 | 2 |
| 8 | 3 | 2 | 1 | 3 |
| 9 | 3 | 3 | 2 | 1 |

Table 1 represents an L9 orthogonal table and this orthogonal table indicates that each of the four design parameters P1 to P4 are given three specific values 1, 2 and 3, nine trial products, each having a different combination of the values, are manufactured or simulated. That is, three appropriate specific design values (herein referred to as "levels") are preliminarily given for each design parameter. For example, Trial product no. 1 is manufactured or simulated with Level 1 for all of the design parameters P1 to P4, and Trial product no. 4 with Level 2 for the design parameter P1, Level 1 for the design parameter P2, with Level 2 for the design parameter P3 and Level 3 for the with design parameter P4 (step 201).

When selections of the orthogonal table and the design parameters are inputted, the means for designing trial products 101 in FIG. 1 outputs a list of trial products to be manufactured based on them. In the case of the orthogonal table of Table 1, for example, a designed list containing nine trial products is outputted.

The user 104 then evaluates the trial products listed in the designed list outputted by the means for designing trial products 102 for each of the predetermined evaluation items as described above (D1 to D4) (step 202) and the results of the evaluation are inputted into the means for depicting characteristic curves 102 (step 203). The evaluation may be simulated by computer.

Based on the inputted evaluation results, the means for depicting characteristic curves 102 finds a system range for each level and a characteristic curve of the evaluation data for each of the design parameters Pi(i=1, 2, 3 or 4) (step 204). The system range means, when one design parameter is fixed to one of the several levels, a range of evaluation values obtained for each evaluation item. The evaluation value may vary within a certain range because of the variation of the other design parameters.

The system range is obtained as follows. First, for one of the design parameters Pi, all of the evaluation values for one level are considered as a data group d. For example, when evaluation value is once obtained for each trial product of the orthogonal table of Table 1, the data group d for one level contains three evaluation values. Several evaluation values for one product may be obtained by repeating the evaluation for the same trial product and this generally makes the data more reliable. The data group is prepared for each evaluation item (D1 to D4). A list of data groups for each level of one design parameter Pi is shown Table 2. Each data group is represented by djk where j is 1, 2 or 3 (level) and k is 1, 2, 3 or 4 ( evaluation item).

TABLE 2

| | Design parameter Pi | | |
|---|---|---|---|
| Evaluation item | Level 1 | Level 2 | Level 3 |
| D1(Rd$_1$) | d$_{11}$ →Rs$_{11}$→I$_{11}$ | d$_{21}$ I$_{21}$ | d$_{31}$ I$_{31}$ |
| D2(Rd$_2$) | d$_{12}$ →Rs$_{12}$→I$_{12}$ | d$_{22}$ I$_{22}$ | d$_{32}$ I$_{32}$ |
| D3(Rd$_3$) | d$_{13}$ →Rs$_{14}$→I$_{13}$ | d$_{23}$ I$_{23}$ | d$_{33}$ I$_{33}$ |
| D4(Rd$_4$) | d$_{14}$ →Rs$_{14}$→I$_{14}$ | d$_{24}$ I$_{24}$ | d$_{34}$ I$_{34}$ |
| | $\sum_{k=1}^{m} I_{1k}$ | $\sum_{k=1}^{m} I_{2k}$ | $\sum_{k=1}^{m} I_{3k}$ |

An average ($d_{ave}$) and the standard deviation ($\sigma$) of those data groups djk are calculated and a system range Rsjk is obtained from the average and standard deviation according to the following equation (1):

$$Rsjk = d_{ave} \pm a\, \sigma \qquad (1)$$

As the constant a, which affects the upper and lower limits of the system range, 1.0 or 1.5 is usually used. However, when the number of data is large, 2 or 3, for example, may be used for a. This is based on the fact that 95.5% of the evaluation values (data) fall within the range of $\pm 2\,\sigma$ when the probability distribution of the evaluation values (data) is assumed to be normal distribution.

Figure 3:
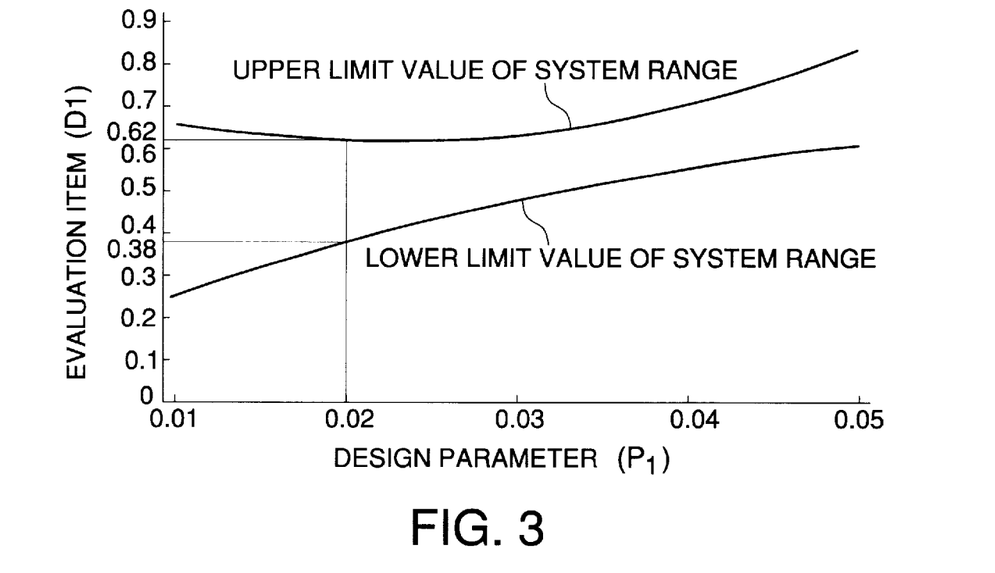
FIG. 3 is a graph representing an example of characteristic curves of a required performance item for a design parameter in the method for determining optimum value of design parameters according to the present invention.
Figure 4:
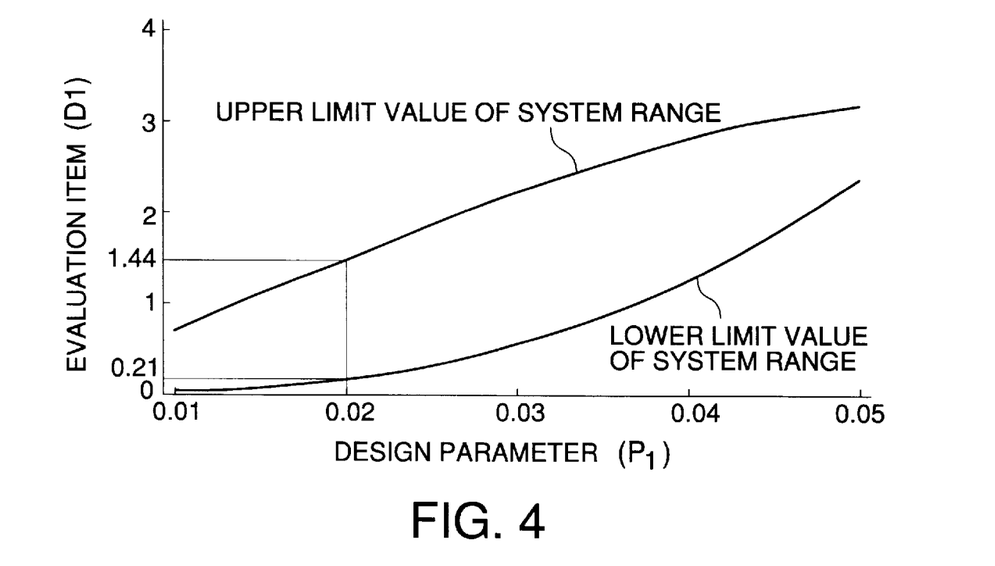
FIG. 4 is a graph representing another example of characteristic curves of performance requirement for a design parameter in the method for determining optimum values of design parameters according to the present invention.

The means for depicting characteristic curves 102 forms system-range characteristic curves of evaluation items for each of the design parameters using an upper limit value and a lower limit value of the system ranges. The upper limit value and lower limit value of the system ranges are plotted against each level. Examples of such characteristic curves of design parameters are shown in FIG. 3 and FIG. 4. The curves may be preferably interpolated or fitted with a specific curve such as a quadric curve to obtain smooth curves as shown in the figures. The figures on the ordinate and transverse axes represent values of specific design parameters and evaluation items and hence the present invention is not limited by them.

Then, design ranges Rdk of evaluation items are inputted to the deducing means 103 (step 205), and the means affords optimum values of the design parameters using the system ranges Rsjk obtained as described above and the design ranges Rdk. Though the design ranges may be preliminarily determined specific ones, they may be defined by an average of the system range, $R_{Save}$, i.e., a range of $R_{Save}$ or greater ($\geq R_{Save}$) or $R_{Save}$ or less ($\leq R_{Save}$), when an appropriate value cannot be determined. Selection of the range, whether the range of the average or greater or the range of the average or less, depends on the nature of each evaluation item.

An optimum value is obtained as follows.

First, an overlapping range (common range) Rcjk of the system range Rsjk and the design range Rdk is determined and an amount of information Ijk is calculated according to the following equation (2) (step 206):

$$Ijk = ln(Rsjk/Rcjk) \qquad (2)$$

The amount of information is an amount defined by the Information Integration Method, which has been proposed as a method for systematically and efficiently evaluation the superiority and inferiority of several systems with a plurality of evaluation items. The amount of information is defined as an index representing information, matter and energy necessary for transferring an initial condition 1 to another condition 2 and calculated by the following equation (3):

$$I = ln(1/p1) - ln(1/p2) = ln(p1/p2) \qquad (3)$$

wherein p1 is the probability that the system is in the condition 1 and p2 is the probability that the system is in the condition 2.

Figure 5A:
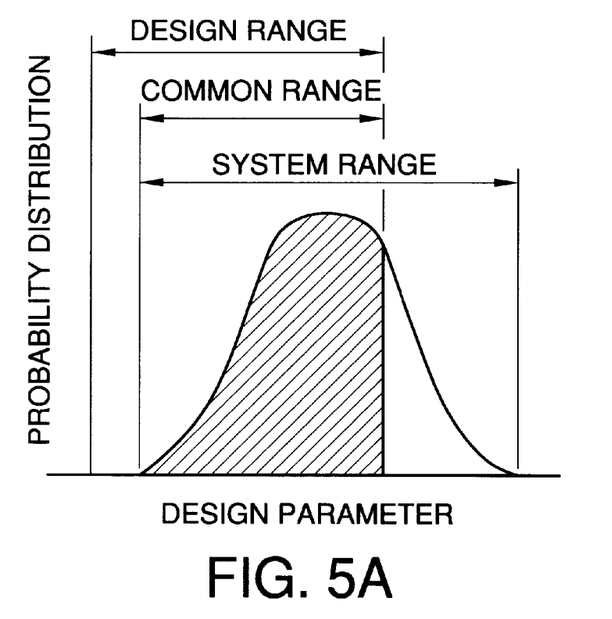

In a probability density distribution such as shown in FIG. 5(*a*), the system range is defined as a range within which a given system parameter will always fall, the design range is defined as a range of a system parameter specified by design, and the common range is defined as an overlapping range of the system range and the design range. The amount of information necessary for transferring the condition 1 (condition within the system range) to the condition 2 (condition within the common range, i.e., within the design range ) is similarly represented by the equation (3): I=ln(1/p1)−ln(1/p2)=1n(p1/p2) (3), and p1 is the probability that the system parameter takes a value within the system range (the integrated value of probability density of the distribution curve shown in FIG. 5(*1*)) and eventually takes a value of 1. p2 is another probability that the system parameter takes a value within the common range after some modifications (similarly, an integrated value of probability density of the distribution curve within the common range).

This means that an amount of information equivalent to I calculated by the equation (3) must be added to the system in order that the system parameter takes a value within a desired range (common range), i.e., in order to take the system from the initial condition 1 to the target condition 2.

Figure 5B:
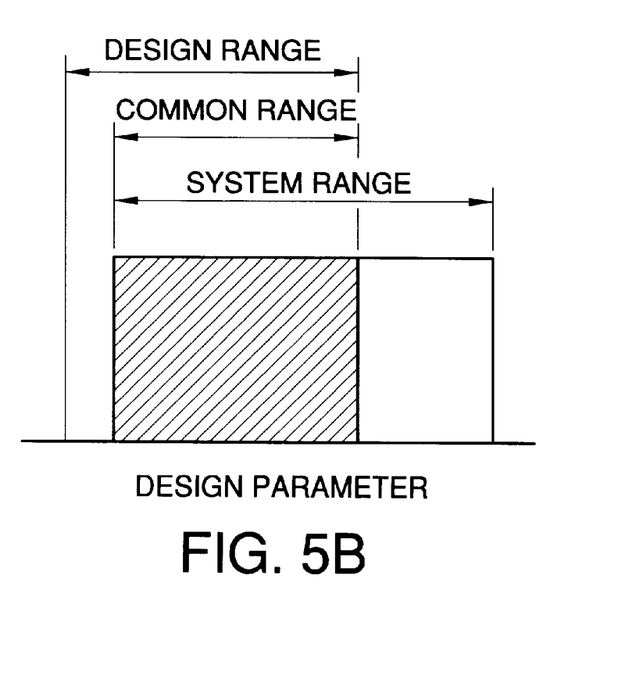

A uniform probability density distribution such as shown in FIG. 5(*b*), not a strict probability density distribution curve, may generally be used as the practical probability density distribution of system parameter for most cases without any problem. Therefore, the equation (3) may be revised so that it should meet the uniform probability density distribution such as shown in FIG. 5(*b*) and represented as: I=ln(p1//p2)=ln(system range(l1)/common range(l2)). This equation corresponds to the equation (2).

As described above, the amount of information is calculated for every level with regard to every evaluation item (D1 to D4) an the amounts of information are added up for each level to afford a total amount of information Ij (step 206). That is, the total amount of information Ij of level j is obtained according to the following equation:

$$Ij = \Sigma Ijk (k=1 \rightarrow m) \qquad (4)$$

The sum of the amounts of information for each design parameter is an amount of information when a plurality of independently variable design parameters are totally considered. Because the amount of information if an index for indicating information, energy and matter necessary for transferring a system from a condition to another condition as already mentioned above, it can be concluded that "the best system is one showing a minimum total amount of information". A system can be evaluated by using this conclusion as an axiom.

According to the method for determining optimum values of the present invention, optimum values of design parameters are determined in accordance with the above axiom. For this purpose, the total amounts of information I are calculated for every level and they are plotted along the ordinate axis against the levels of the design parameter Pi along the transverse axis (step 207). The curve for the amount of information may be analytically obtained by fitting it with a specific curve such as a quadric curve. It has been explained hitherto that the total amounts of information I are found for every level. But in case that the system-range characteristic curves (e.g. FIGS. 3 and 4) of a design parameter are found by using function fitting or interpolation of system range values, the total amounts of information I may be preferably found by calculating amounts of information using multiple interpolated system range values corresponding to multiple design parameter values in accordance with the equation (2) and obtaining the sum of the amounts of information in accordance with the equation (4). This enables to afford more precise (accurate) total amounts of information vs. design parameter curves. Then, a value of the design parameter corresponding to the minimum value of the total amount of information in the curve (graph) representing the total amount of information I as a function of (the level of ) the design parameter Pi is determined and employed as the optimum value of the design parameter (step 208).

System ranges, amounts of information an total amounts of information are determined for every level of every design parameter as described above (steps 203–207) to determine optimum values.

The question of whether weighting of amounts of information should be performed arises when amounts of design parameters are calculated. However, concerning the above information estimation, weighting of amounts of information concerning the above information estimation, weighting of amounts of information should not be performed. For example, if weight α and weight β are given to amounts of information I1 and I2 respectively, the sum of the amounts of information is αI1+βI2 and it is excluded from the scope of the definition of amount of information. In practical cases, there may in fact be differences in importance among evaluation items when a system is evaluated. In such a case, however, the design range is defined more strictly for a more important evaluation item. Therefore, its amount of information to be calculated inevitably becomes larger and relative importance is given automatically and efficiently.

As described above, according to the method and the system for determining optimum values for design parameters of the present invention, it is possible to reasonably design an optimum product in a short period of time by evaluating a small number of trial products listed up in an orthogonal table for a plurality of evaluation items and obtaining design parameters which minimize the total amounts of information based on the Information Integration Method.

Although it was described that both characteristic curves for each evaluation item for each design parameter (step 204) and design parameter-total amount of information curves (step 207) are obtained, the object of the present invention can be achieved without obtaining the characteristic curves for each evaluation site.

Moreover, though the present invention is explained for the case that L9 is used as the orthogonal table and hence four design parameters were used in the above description, the present invention is not limited to this. For example, L18, L27 and the like may be used as the orthogonal table. When the former is employed, combinations of one design parameter with 2 levels and 7 design parameters with 3 levels can be listed.

EXAMPLE

Figure 6:
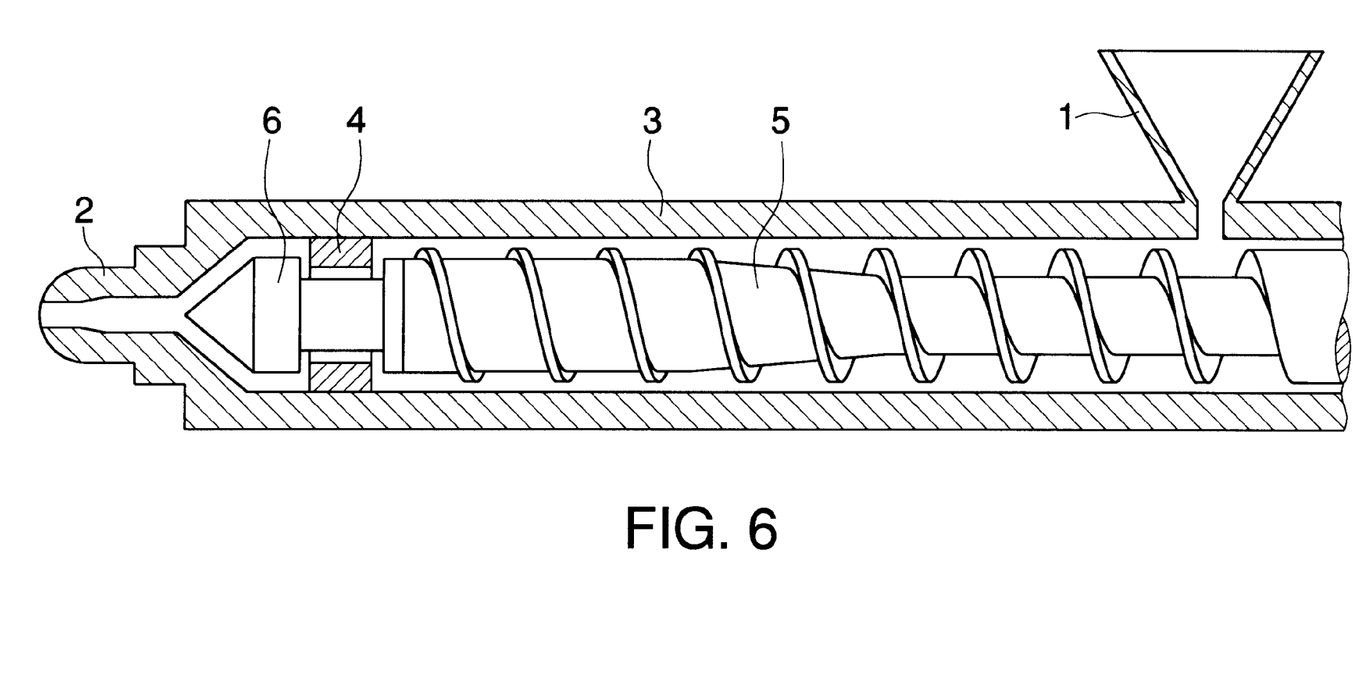
FIG. 6 is a cross-sectional view of an essential part of an injection molding machine designed by the method for determining optimum values of design parameters according to the present invention.

An injection molding machine as shown in FIG. 6 was designed in accordance with the method for determining optimum values according to the present invention. The injection molding machine comprises a sheath 3 having a hopper 1 for feeding resin material and a nozzle 2 for injecting the resin material, a screw 5 installed in the sheath 3 by means of ring valve 4 and screw head 6 at the head of the screw. Four design parameters were considered: length and inner diameter of the ring valve 4, heating temperature of the sheath 3 and rotation speed of the screw 5. Trial products were designed according to L9 orthogonal table and evaluated. Abrasion degrees of the ring valve regarding inner diameter and length and the screw head, total electric power consumption and resin flow rate per unit time were evaluated as evaluation items.

As a result, optimum values could be determined by manufacturing only nine trial products. Evaluation results for a product designed with the obtained optimum values and a product before the design are shown in Table 3. As clearly seen from the results of Table 3, a product could be manufactured with markedly reduced abrasion, total electric power consumption and markedly improved resin flow rate per unit time (productivity).

TABLE 3

| Experiment | Abrasion dimension (mm) | | | Total power consumption (kWh) | Resin flow rate (g/min) |
| --- | --- | --- | --- | --- | --- |
| | Ring valve | | Srew head Length | | |
| | Inner diameter | Length | | | |
| Nakazawa method | 0.001 | 0.082 | 0.247 | 15.3 | 130 |
| Conventional machine | 0.005 | 0.234 | 0.533 | 32.3 | 54 |

As clearly demonstrated by the example mentioned above, optimum values of design parameters can be efficiently determined considering several required performance items (evaluation items) by the method for determining optimum values of design parameters of the present invention. In addition, the method for determining optimum values of design parameters of the present invention does not require construction of any mathematical model for analytically building a system including design parameters and required performance items and therefore can reliably determine the optimum values with a small number of trial products without failure. Accordingly, the method of the present invention can make a term required for product development predictable and markedly shorten the term compared with conventional methods for product development on trial-and-error-basis.

What is claimed is:

1. A method for manufacturing a product having optimum design parameters, wherein the optimum values of design parameters are obtained by evaluating products produced with a plurality (n) of design parameters (P1, P2 . . . Pn) for a plurality (m) of evaluation items (D1, D2 . . . Dm), comprising the following steps:

1) a plurality of trial products, each having a different combination of one level for each design parameter among several levels, said combination determined based on an orthogonal table, are evaluated for a plurality (m) of the evaluation items to afford evaluation values;

2) for one design parameter (P1), a system range for each level is found from evaluation values of one evaluation item (D1) for each level and an amount of information (I1) is obtained for each level from they system range and a design range for the evaluation item;

3) amounts of information (I2 to Im) for each level of the one design parameter (P1) are similarly obtained for the other evaluation items (D2, D3 . . . Dm) and the amounts of information (I1 to Im) for the evaluation items (D1 to Dm) are added to obtain a total amount of information for each level;

4) a system range for one level (Rs) is obtained from an average of evaluation values of one evalutaion item with the level ($d_{ave}$) and standard deviation ($\sigma$) in accordance with the equation $Rs = d_{ave} \pm a\sigma$ where a is a constant of 1.0 or more;

5) a characteristic curve of the total amount of information for the one design parameter (P1) is depicted from the total amounts of information obtained for the levels and a value of the design parameter giving the smallest total amount of information is determined as an optimum value of the design parameter P1;

6) the steps of 2) to 5) are performed for the other design parameters (P2, P3 . . . Pn); and 7) a product is manufactured based on the optimum design parameters obtained after performing steps 1) to 6).

2. The method of claim 1, wherein an amount of information I is obtained in accordance with equation $I = \ln(Rs/Rc)$ where Rs represents the system range and Rc represents an overlapping range of the system range and the design range Rd.

3. A computerized method for manufacturing a product having optimum design parameters, which comprises the steps of:

1) inputting evaluation values obtained by evaluating a plurality of trial products each having a combination of one of several levels given for each of a plurality (n) of design parameters (P1, P2 . . . Pn) regarding a plurality (m) of evaluation items (D1, D2 . . . Dm);

2) for one design parameter (p1), obtaining a system range (Rs) for each level from an average of evaluation values of one evaluation item (D1) for each level ($d_{ave}$) and a standard deviation ($\sigma$) in accordance with the equation of $Rs = d_{ave} \pm a\sigma$ where a is a positive constant of 1.0 or more;

3) obtaining an amount of information (I1) for each level from the system range (Rs) and a predetermined design range (Rd) in accordance with the equation of $I1 = \ln(Rs/Rc)$ where Rs represents the system range and Rc represents an overlapping range of the system range (Rs) and the design range;

4) similarly obtaining amounts of information (I2 to Im) for each level of the design parameter (P1) for the other evaluation items (D2, D3 . . . Dm);

5) adding the amounts of information (I1 to Im) of the evaluation items (D1 to Dm) to afford a total amount of information for each level;

6) depicting a characteristic curve of the total amount of information for the design parameter (P1);

7) determining a value of the design parameter giving the smallest total amount of information as an optimum value of the design parameter (P1) based on the characteristic curve;

8) performing the steps 2) to 7) regarding each of the other design parameters (P2, P3 . . . Pn) to afford optimum values for all the design parameters; and 9) manufacturing a product based on the optimum design parameters obtained after performing steps 1) to 8).

4. A system for manufacturing products having optimum design parameters, which comprises:

means for designing trial products which is inputted with several levels of a plurality (n) of design parameters of a product and outputs a trial product design based on a prescribed orthogonal table;

means for depicting characteristic curves which is inputted with evaluation values obtained by evaluation of a plurality (m) of evaluation items and depicting characteristic curves of the evaluation data for the values of design parameters;

means for deducing optimum values which outputs optimum values of the design parameters from the characteristic curves depicted by the means for depicting characteristic curves and inputted design ranges; and computerized means for manufacturing a product according to the optimum design obtained.

5. The system of claim 4, wherein the deducing means finds the optimum values of the design parameters by evaluating products produced with a plurality (n) of design parameters (P1, P2 . . . Pn) for a plurality (m) of evaluation items (D1, D2 . . . Dm), characterized in that:

1) a plurality of trial products, each having a different combination of one level for each design parameter among several levels, are evaluated for a plurality (m) of the evaluation items to afford evaluation values;

2) for one design parameter (P1), a system range for each level is found from evaluation values of one evaluation item (D1) for each level and an amount of information (I1) is obtained for each level from the system range and a design range for the evaluation item;

3) amounts of information (I2 to Im) for each level of the one design parameter (P1) are similarly obtained for the other evaluation items (D2, D3 . . . Dm) and the amounts of information (I1 to Im) for the evaluation items (D1 to Dm) are added to obtain a total amount of information for each level;

4) a characteristic curve of the total amount of information for the one design parameter (P1) is depicted from the total amounts of information obtained for the levels and a value of the design parameter giving the smallest total amount of information is determined as an optimum value of the design parameter (P1); and 5) the steps of 2) to 4) are performed for the outer design parameters (P2, P3 . . . Pn).

6. The system of claim 5, wherein a system range for one level (Rs) is obtained from an average of evaluation values of one evaluation item with the level ($d_{ave}$) and standard deviation ($\sigma$) in accordance with the equation of Rs=$d_{ave}$=a $\sigma$ where a is a constant of 1.0 or more.

7. The system of claim 5, wherein an amount of information I is obtained in accordance with the equation I=1n (Rs/Rc) where Rs represents the system range and Rc represents an overlapping range of the system range and the design range Rd.

8. The system of claim 4, wherein the optimum values of the design parameters are determined by:

1) inputting evaluation values obtained by evaluating a plurality of trial products each having a combination of one of several levels given for each of a plurality (n) of design parameters (P1, P2 . . . Pn) regarding a plurality (m) of evaluation items (D1, D2 . . . Dm);

2) for one design parameter (P1), obtaining a system range (Rs) for each level from an average of evaluation values of one evaluation item (D1) for each level ($d_{ave}$) and a standard deviation ($\sigma$) in accordance with the equation of Rs=$d_{ave}$±a $\sigma$ where a is a positive constant of 1.0 ore more;

3) obtaining an amount of information (I1) for each level from the system range (Rs) and a predetermined design range (Rd) in accordance with the equation of I1=1n (Rs/Rc) where Rs represents the system range and Rc represents an overlapping range of the system range (Rs) and the design range;

4) similarly obtaining amounts of information (I2 to Im) for each level of the design parameter (P1) for the other evaluation items (D2, D3 . . . Dm);

5) adding the amounts of information (I1 to Im) of the evaluation items (D1 to Dm) to afford a total amount of information for each level;

6) depicting a characteristic curve of the total amount of information for the design parameter (P1);

7) determining a value of the design parameter giving the smallest total amount of information as an optimum value of the design parameter (P1) based on the characteristic curve; and 8) performing the steps 2) to 7) regarding each of the other design parameters (P2, P3 . . . Pn) to afford optimum values for all the design parameters.

* * * * *